Aug. 28, 1962     H. P. SCHICK     3,051,601
LAMINATED POLYURETHANE FOAM CUSHION
Filed Nov. 7, 1958

INVENTOR
Harold P. Schick
BY
ATTORNEYS

United States Patent Office 3,051,601  
Patented Aug. 28, 1962

---

3,051,601  
LAMINATED POLYURETHANE FOAM CUSHION  
Harold P. Schick, Cuyahoga Falls, Ohio, assignor to The General Tire & Rubber Company, Akron, Ohio, a corporation of Ohio  
Filed Nov. 7, 1958, Ser. No. 772,637  
3 Claims. (Cl. 154—54)

The present invention relates to cellular polyurethane materials suitable for use in cushions, mattresses and the like.

Polyalkylene ether glycol/polyisocyanate foamed materials have a great potential for use in cushioning articles such as seat cushions or mattresses. One of the drawbacks to the use of polyalkylene ether glycol urethane foams is the fact that they generally have a low modulus and a relatively low load carrying capacity at high deflection which causes foam cushions to "bottom out" at high deflection particularly when a hard unyielding base such as plywood is used under the cushions.

Attempts to increase the load capacity of polyether urethane foams at high deflection with fillers have also greatly increased the load carrying capacity at low deflection. Thus the modified polyether foam has not had a soft initial feel which property is also highly desired in cushioning uses so that when a person first sits down, little resistance is offered.

It has been proposed, as seen in U.S. Patent No. 2,787,601, to add fillers such as magnesium carbonate or wood cellulose to polyester-urethane foams. As indicated in the above patent, the resultant foams were denser, more rigid and more brittle. Such properties rendered them unsuitable for use as cushioning material since, although they increased the load carrying capacity at high deflection, the fillers also greatly increased the load carrying value at low deflection. In addition, polyalkylene ether glycol/polyisocyanate foams are generally preferred over polyester/polyisocyanate foams for cushioning uses because of their superior resilience and humidity aging properties.

One of the objects of the present invention is to provide an improved low density polyalkylene ether glycol/polyisocyanate foam cushion having a relatively low load carrying capacity at relatively low deflection and a relatively high load carrying capacity at high deflection.

Other objects in the present invention are to provide improved cellular polyether urethane mattresses, cushions and the like which can be used over a hard unyielding base without using springs.

It is an object to provide relatively low density foamed polyalkylene ether glycol/polyisocyanate cushions having a good balance of desirable properties, such as resistance to humidity aging, load carrying capacity, strength and resiliency.

These and other objects will be apparent from the specification, claims, and appended drawing in which:

Figure 1:
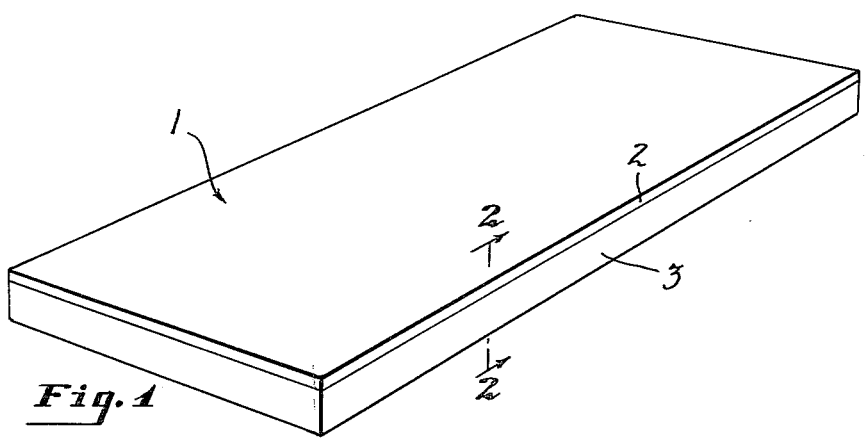
FIGURE 1 is a perspective view of a mattress made according to the present invention.
Figure 2:
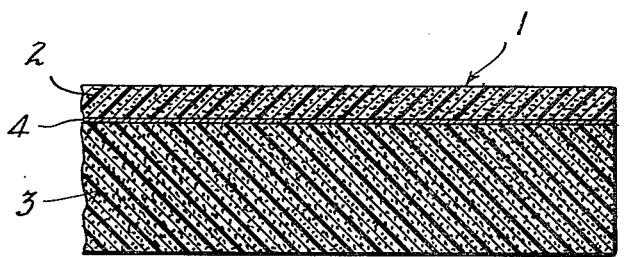
FIG. 2 is fragmentary sectional view taken along the lines 2—2 indicated in FIG. 1.

I have found that an excellent foamed polyurethane mattress 1 may be made from a relatively thin upper layer 2 of a relatively soft low density foamed polyether urethane material which is preferably substantially devoid of fillers and a relatively thick base layer 3 of a relatively low density foamed polyether urethane material having less deflection per unit of load and therefore having more load carrying capacity which is made by incorporating certain special fillers therein. A suitable adhesive layer 4 may be used to bond the thin layer 2 to the thick layer 3. The relatively thick foamed layer 3 is a cellular polyether urethane cushioning material made by incorporating finely divided particles 5 of a fibrous or flaky material such as wood cellulose or talc with the polyurethane forming reactants before the foaming thereof.

The composite laminated foam article has a soft initial feel and yet is relatively stiff at moderately high deflection, say 50 to 75 percent, which deflection is normally encountered in automotive and furniture applications. The combination of a thin, soft foamed polyether/polyisocyanate material having a low load carrying capacity at low and high deflection amplifies and complements the unusual carrying capacities of the thick base layer of wood cellulose or talc modified foam so that the laminated cushion can be made of about normal thicknesses and yet have the very soft initial feel of luxurious cushioning. Also the combination of a thin soft layer and a thick layer of a stiffer polyalkylene ether glycol urethane sponge provides a high load carrying capacity at 50 to 75 percent or more compression to eliminate the use of springs in such applications as car seats and chair seats.

The wood cellulose or talc modified polyether urethane foam material itself is the subject matter of Gmitter et al. application Serial No. 769,576.

Figure 3:
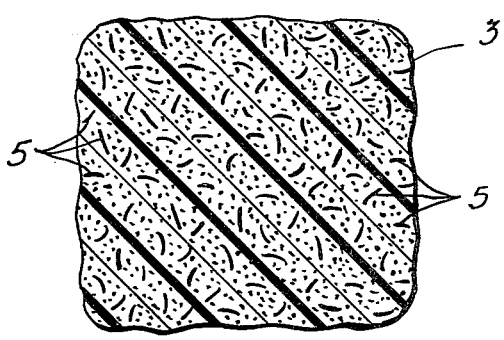
FIG. 3 is a fragmentary sectional view of the base layer of the mattress of FIG. 1 on an enlarged scale.

The polyether/polyisocyanate foams of both the thin and thick layers are made generally in about the same manner except that the thick base layer is made with fiber or flake materials such as wood cellulose which greatly stiffen it and thus improve the load-deflection curves of the resultant material. Each particle of the fibrous or flaky material has a length several times its thickness, which property apparently is of some importance in providing the resultant foams with their unusual properties. The fibrous and flaky materials are also preferably microscopic in size as indicated in FIG. 3.

The polyurethane forming reactants used to make both the thin layer 3 and the thick layer 4 are (1) a polyalkylene ether glycol generally having a molecular weight of at least 750 and having hydroxyl end groups and (2) a polyisocyanate having 2 to 3 functional isocyanate groups. The cellular polyurethanes are formed by reacting the above described polyether and polyisocyanate and expanding the resultant reaction product with a blowing agent which generally is carbon dioxide formed from the reaction between excess diisocyanate and water, or a gas formed by the volatilization of a readily liquefied gas such as alkane substituted halogen gas or a gas formed by the decomposition of a compound such as ammonium carbonate. Generally, in the past, polyol-diisocyanate foams have been made by reacting a non-linear slightly branched polyalkylene ether glycol with a diisocyanate and a small amount of water or by reacting a linear polyether with a mixture of di- and tri-isocyanates and water. An excess of diisocyanate over that needed to react with the polyether to form the polyurethane was used to react with the water and produce carbon dioxide for forming the cells in the solid product.

A preferred method of making a foamed polyether/urethane material for the thin upper layer of the laminated cushion is by reacting a polyalkylene ether glycol and a diisocyanate so as to form a flowable or viscous dry partially reacted "prepolymer" and subsequently by the addition of an activator mixture which generally comprises water and a suitable reaction catalyst to the previously mentioned dry "prepolymer" forming the desired spongy polyurethane. In addition, a crosslinking agent containing a plurality of labile hydrogens, may also be included in the activator mixture. This prepolymer process is the subject matter of application Serial No. 626,313 of George T. Gmitter filed December 5, 1956, which is assigned to the same assignee as this application, now abandoned.

The finely divided particles of wood cellulose or talc, which are used to make the thick base layer of the improved cushion in accordance with the present invention, may be added by dispersing in the polyether-polyisocyanate prepolymer or preferably added to the prepolymer forming ingredients as the prepolymer is being made. Thereafter, the prepolymer is reacted with the activator mixture. In addition, particularly when polyalkylene ether glycol foams are being prepared, the activator mixture should preferably contain a small amount, say .1 to 2% by weight based on the polyalkylene ether glycol of a silicone oil, such as liquid dimethyl siloxane polymer. The silicone oil is added to stabilize the foam and insure good foam structure which is generally required when using a polyalkylene ether glycol as the starting polyol material to make commercially acceptable foamed material.

The amounts of wood cellulose and/or talc which may be used in the polyether urethane foamed material of the thick base layer is generally about 5 to 50 parts by weight of the polyether plus polyisocyanate.

While the effectiveness of the foam material in a cushioning application may depend on many factors such as load-deflection curves, springing, and type of upholstery used, generally at least 2 and preferably 5 parts by weight of wood cellulose or talc are required to substantially increase the load carrying capacity of the foam at high or moderately-high deflection, say from 50% to 90% deflection. The best balance of physical properties including low load carrying capacity at low deflection, high load carrying capacity at high deflection, resiliency, humidity aging, tensile strength and tear strength properties are obtained when 10 to 25 parts by weight of wood cellulose or talc are incorporated into the polyether urethane foam. Generally, more than 55 to 60 parts of the load-deflection curve improving materials increase the density, modulus, and load carrying capacity at low deflection, say 5 to 25 percent deflection, to such an extent that the properties of the foam are no longer suitable for use in commercial cushioning application in which a hard unyielding base such as plywood is used under the foam. In addition the tensile and tear strength of highly loaded polyether urethane sponge material are greatly lowered.

It is important that the particle size of the wood cellulose, talc and other mineral fillers be relatively fine, having an average particle size of generally 1 to 100 microns or even finer for best results. The fibers and flakes are, for best results, so small that they can be seen in the foamed material only with the aid of a microscope and the microscopic size is indicated in FIG. 3. As previously described, each particle also should have a length several times its thickness, which ratio is generally in the range of about 2 to 8 times its thickness or diameter. It is preferred that the average particle size of wood cellulose be about 35 to 90 microns while the preferred particle size range of talc is about 3 to 45 microns.

When using wood cellulose having an average particle size of 100 down to 1 micron, it is preferred that at least about 60 percent of the material pass through a 100 mesh screen (U.S. Sieve Series) and at least 40 percent pass through a 200 mesh screen.

Wood cellulose, in the form of a white free-flowing powder, also oftentimes unexpectedly provides polyether urethane foams with improved humidity aging resistance both at normal and elevated temperatures. Another surprising improvement obtained by the use of wood cellulose was the improvement of flex resistance of the resultant foams over untreated polyether-polyisocyanate foams. The flex resistance of the improved polyether-urethane foams is at least as good as the best slab foams made of natural rubber latex as observed in standard flexing tests at 80% deflection.

The addition of fine talc particles to the prepolymer forming materials or the prepolymer itself, as before indicated, greatly increases the stiffness of the resultant polyurethane foam at high deflection but does not appreciably increase the stiffness at low deflection. The other physical properties of the resultant improved foam are changed very little including the feel of foam to the sense of touch which is important in some applications.

Suitable talc particles are relatively small in size and preferably at least as fine as 3 to 45 microns as previously discussed in the case of the wood cellulose particles. Talc ($3MgO—4SiO_2—H_2O$), a hydrous magnesium silicate, is a mineral of crystal system No. 4 and has a specific gravity of about 2.5 to 2.8.

While not as effctive as talc, other fine mineral particles may be used to obtain some stiffening of the resultant foams at high deflection without a corresponding increase of load carrying capacity at low deflection, although the increase of load capacity at low deflection is usually considerably more, say 2 to 3% more on the 25% compression deflection set test. In addition the use of other mineral additives increases the density of the foams to a much greater degree than talc—sometimes as much as 1 to 2 lbs./cu. ft. over the talc made foams when about 25-30 parts are used.

Minerals suitable for use in the present invention are inorganic materials found ready made in nature, and not a product of the life or decay of an organism. The mineral materials generally have a definite and characteristic crystalline structure. While finely divided talc is the best mineral load-deflection curve improving material, other very finely divided minerals may be used in place of whole or part of the talc such as mica, hydrated calcium silicate and even calcium carbonate providing it is of extremely fine particle size so that substantially all of the particles are less than 15 microns in diameter and providing at least some talc or flaky mineral having a length several times its thickness is used, say at least 5 parts. Muscovite or common mica

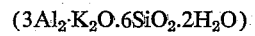

$(3Al_2·K_2O·6SiO_2·2H_2O)$ of crystal system No. 5 and a specific gravity of about 2.7 to 3.0, is the preferred mica of the group of a number of lustrous, laminated, hard silicate minerals of micaceous character which are characterized by their cleavage in one direction. Generally, the mica materials are hydrous silicates of aluminum with varying composition, some of them being associated with potassium, lithium, magnesium and iron.

The calcium silicate, in addition to having a particle size of about 0.020 to .030 microns or even finer, is preferably a soft, highly absorptive, precipitated hydrated calcium silicate such as a hydrated calcium silicate mineral pigment Silene EF.

As previously discussed, urethane polymer is formed by two main reacting ingredients, the polyalkylene ether glycol and the polyisocyante. The preferred polyisocyanate is 2,4-tolylene diisocyanate or a mixture of 2,4- and 2,6-tolylene diisocyanates, although other organic polyisocyanates have 2 to 3 functional isocyanate groups including organic diisocyanates may be used such as p,p'-diisocyanato diphenyl methane, p-phenylene diisocyanate, m-phenylene diisocyanate, durene diisocyanate and hexamethylene diisocyanate. In addition, particularly when the polyol is not branched enough to effectively trap $CO_2$ to form a foamed material or where a more rigid-type foam is desired at least a part of the polyisocyanate may be a triisocyanate such as p,p',p''-triisocyanato triphenylmethane.

In the preferred method of preparing the polyether-polyisocyanate foamed materials, an equivalent weight of a polyalkylene ether glycol is first reacted with from about 1.1 to 12 equivalents or preferably from about 2 to 6 equivalents of an organic polyisocyanate of 2 to 3 isocyanate groups and preferably two reactive isocyanate groups to provide a higher molecular weight urethane polymer containing some free isocyanate groups. Some unreacted polyisocyanate groups may also be present.

The above prepolymer is then mixed with about 0.5 to 5.0 percent by weight of the prepolymer of water, about 0.5 to 10 percent of a reaction catalyst, and about 0.1 to 2 percent of a silicone oil to form a foamed material. A crosslinking agent, comprising a polyfunctional material having at least 3 active hydrogen atoms, may be used in amounts of about 0.5 to 5 percent by weight in order to more effectively entrap $CO_2$.

The polyalkylene ether glycols, which are preferably reacted with polyisocyanates by the prepolymer method, have the general formula $HO-(RO)_n-H$, where R represents divalent aliphatic radicals such as ethylene, propylene, butylene, isopropylene, isobutylene, tetramethylene, etc., or aromatic hydrocarbon radicals such as phenylene and the aliphatic or aromatic radicals may be the same or different. The integer represented by $n$ is such that the average molecular weight of the polyether glycol is greater than 750. In accordance with the present invention, benefits are obtained when the molecular weight preferably is at least 900 although the best physical properties in the resultant cellular polyether urethanes are obtained when the molecular weight of the polyether glycol is 1500 to 4000 or 5000, although improved products could be obtained when the molecular weight of the polyether glycol is as high as 10,000.

Excellent foams may be made by using a polyether glycol starting material which is a condensation product of an alkylene oxide of preferably 2 to 4 carbon atoms and a polyhydric alcohol of less than 7 carbon atoms and having 3 to 6 hydroxyl groups such as glycerol, pentaerythritol, hexane triol-1,2,6 and trimethylol propane. Such polyether glycols, having molecular weights of at least 750 are branched in nature and terminated with hydroxyl groups. Condensation products from mixtures of ethylene and propylene oxides are particularly useful in producing improved foamed polyurethanes for cushioning applications.

Generally, the branched polyether glycols with primary hydroxyl terminal groups are preferred. Preferred branched polyether glycols with the terminal hydroxyl groups may be formed by condensing propylene oxide and/or a mixture of propylene oxide and ethylene oxides with about 0.1 to 10 mol percent based on the alkylene oxides of a polyhydric alcohol such as glycerol, trimethylol propane and/or hexane triol-1,2,6. At the end of the condensation of the above, ethylene oxide is condensed with the resultant product to provide primary hydroxy groups at ends of the branches. Two to four moles or so of ethylene oxide or even of propylene oxide-1,3 is usually desired for reaction with the first condensation product to provide a branched polyether with a preferred number of primary hydroxyl groups.

While it has been indicated previously that generally the polyether-urethane foams are made with a small amount of water, part or all of the water can be omitted and a halogen substituted alkane gas having a boiling point at between $-60°$ and $+80°$ F. such as dichloromonochloromethane. Difluorodichlomethane may be used also as a blowing agent for producing polyurethane foams as described in the application Serial No. 541,823, of Charles Frost, filed October 20, 1955 and assigned to the same assignee of this application, now abandoned.

When all or part of the water is replaced by a halogen substituted alkane gas, crosslinking action may be provided to enable the liquid reactants to change to a solid material and properly entrap the blowing gas by use of the above described branched polyether glycols, and/or by crosslinking agents such as trimethylol propane hereinafter discussed more fully and/or an organic isocyanate having more than two isocyanate groups.

As representative crosslinking agents having at least 3 active hydrogen atoms, there are organic polyols such as trimethylol propane, pentaerythritol, the beta ethanol ether of 2-methyl, 2-methylol, 4-methyl, 5-hydroxy pentane, N,N,N',N'-tetrakis (2-hydroxypropyl) ethylenediamine and hexamethylene tetramine.

As representative reaction catalysts for the diisocyanate-polyether reaction there are tertiary amines such as di(ethyl amine ethanol adipate), amino alcohols including butyl diethanol amine, trialkyl amines including triethyl amine and tributyl amine, morpholines including N-methyl morpholine, pyridines including 4-N-amyl pyridine and organo metallic compounds such as cobalt and nickel, linoleates, etc. Generally alkyl tertiary amines give faster acceleration than amino alcohols or morpholines or pyridines. Mixtures of alkyl tertiary amines with either morpholines or amino alcohols or pyridine compounds are preferred to give a slower acceleration. However, in some cases, especially when the amount and rate of crosslinking is adequate, the tri-alkyl tertiary amines alone produce excellent cellular products. The amount of catalyst used is generally about .5% to 2% of the weight of the prepolymer. When the amount of the catalyst is less than 0.1% particularly when no tertiary amine is present the reaction is generally too slow for economy and when much more than 4 or 5% of the catalyst is used, waste of catalyst and deterioration in quality results.

The following examples illustrate the present invention.

EXAMPLE 1

Polyurethane foam materials suitable for use as the base layer of the improved cushions of the present invention were made with finely divided wood cellular particles incorporated in the reaction forming ingredients before the reaction thereof. The amounts of polyurethane materials and wood cellulose are found in the following formula:

*Table I*

100 grams prepolymer
39 grams 80/20 TDI, mixture of 80% (2,4- and 20% 2,6-tolylene diisocyanate)
0.35 grams dimethyl siloxane polymer, viscosity of 100 centistokes at 100° F.
1.25 grams triethylamine
1.50 grams N-methyl morpholine
1.90 grams water
20 grams finely divided wood cellulose The prepolymer material was prepared by mixing and reacting 180 grams of a 65/35 mixture of 2,4- and 2,6-tolylene diisocyanate with 600 grams of poly(ethylene-propylene) ether glycol having a molecular weight of 2000. The wood cellulose was first mixed into the prepolymer and the wood cellulose/prepolymer mix added to an activator mixture containing silicone oil, triethyamine and N-methyl morpholine. The activator mixture and prepolymer was mixed by air stirrers in one-half gallon containers. The resultant foamed products were formed by the liberation of carbon dioxide from reaction of water and isocyanate groups of the diisocyanate. The samples were cured for one hour at 155 to 120° C. and then kept at room temperature for 16 hours. The samples thereafter were cured again for 8 hours at 115 to 120° C. Thereafter, the cured foamed material was tested, along with a control sample made according to the recipe of Table I except that no wood cellulose was used. The results of the tests are listed in Table II.

Table II

| | Foam containing 20 parts wood Cellulose | Control Foam no wood Cellulose |
|---|---|---|
| Density lbs/ft.³ | 2.65 | 2.35 |
| Tensile p.s.i | 12.8 | 18.0 |
| Elongation, percent | 240 | 320 |
| Tear, lb./in | 2.00 | 3.5 |
| Resiliency (Schopper), percent | 47 | 50 |
| 50% Deflection Compression Set | 14.3 | 8.5 |
| 90% Deflection Compression Set | 12.7 | 10.9 |
| Indent-load 25% Deflection (lbs./50 sq. in.) | 21.0 | 17.5 |
| Indent-load 50% Deflection (lbs./50 sq. in.) | 40.0 | 27.0 |
| Indent-load 75% Deflection (lbs./50 sq. in.) | 135.0 | 63.0 |
| Flexing Losses: | | |
| 80% Flex 250,000 flexes (80% deflection)— | | |
| 10% Deflection Loss | 30.7 | 40.5 |
| 25% Deflection Loss | 17.1 | 30.9 |
| 50% Deflection Loss | 8.6 | 26.2 |
| 75% Deflection Loss | 0.0 | 0.0 |
| Humidity Aging Changes (Percent change in load deflection): | | |
| 3 hours Steroclave | +12.6 | −13.4 |
| 6 hours Steroclave | −3.0 | −22.5 |
| 9 hours Steroclave | −4.0 | −30.0 |
| Humidity Aging Changes: | | |
| 7 days@195° F., 100% Humidity—Beaker Method | −21.9 | −43.2 |
| 7 days@175° F., 100% Humidity—Humidity oven | −11.4 | −26.7 |

As seen in Table II, 17.5 pounds were required to indent 50 square inches of the control foam material 25 percent. In comparison 21 pounds were required to indent the polyether urethane foam made with 20 parts by weight wood cellulose 25 percent. At higher deflections, namely 50 and 75 percent deflection, pronounced stiffening of the wood cellulose foam is evident. At 75% deflection, 135 pounds were required to indent 50 square inches of the improved polyether urethane foam as compared to only 63 pounds for the standard polyether-urethane foam.

The wood cellulose prepared polyurethane foam, when used as a cushioning material, had a soft initial feel but yet did not "bottom out" at high load, which desirable properties are indicated by the above test data.

As also indicated in Table II, the humidity aging resistance property of the improved polyurethane foam is much better than the control foam.

The Steroclave test is conducted by using a pressure-type cooker which has an atmosphere of 100% relative humidity and a pressure over that of atmospheric. The temperature inside the Steroclave is generally about 220 to 230° F. and the foam samples are kept inside the cooker generally for 3 hour intervals.

In the beaker method of testing humidity aging properties, the foam sample is supported by a wire table or platform over the water level of a 1000 ml. or 2000 ml. beaker. The top of the beaker is generally sealed to prevent circulation of the air over the sample. A film of polyethylene is generally used to cover the top of the beaker and the film taped to hold it on during the duration of the test which may be 7 or more days.

In the humidity oven testing procedure, an atmosphere of 100% relative humidity is maintained inside the oven at a temperature of generally 175° F. Unlike the closed beaker method, there is circulation of air over the foam samples in the humidity oven.

It can be seen in Table II, that the flex resistance of the polyether-urethane foam prepared with wood cellulose is outstanding. The loss in load exhibited by the wood cellulose/polyurethane foam sample was low, approximately only half the loss exhibited by the control foam sample.

EXAMPLE 2

A laminated cushion was prepared from a 4-inch thick base layer of a wood cellulose modified polyether/polyisocyanate foamed material prepared with the recipe shown in Table I and according to the method described in Example 1. A relatively thin layer of about a one inch thickness was made from a recipe similar to that of Table I except the TDI (2,4-tolylene and 2,6-tolylenediisocyanate) and powdered wood cellulose materials were not used.

The thin layer of soft polyether urethane foam was placed over the thick base layer and adhered thereto by a natural rubber latex cement comprising a 25 percent by weight solids content of natural rubber in an organic solvent comprising a mixture of toluene and methyl ethyl ketone.

The composite article had a very soft initial feel and yet had good stiffness at 50 to 75 percent compression. Thus a person sitting on the cushion tends at first to sink easily into the laminated cushion. However, substantial and increased resistance is offered to flattening forces such as a sitting person at 50 to 75 percent compression so that the cushion is never completely flattened out even when person bounces on it.

The adhesive layer in the above example may be substituted for by other adhesive layers formed from natural rubber or synthetic rubber latex-based cements, neoprene base cements, polyisocyanate cements such as those comprising a diisocyanate and a small amount of rubber in a suitable organic solvent.

Suitable cements are natural or GR–S rubber base cements of about 10 to 50% by weight solids content in an organic solvent such as benzene, toluene, methyl ethyl ketone.

The thin layer of soft polyether urethane foam used in Example 2 may be replaced by a thin layer of soft natural rubber latex or synthetic rubber latex foam material to obtain benefits of the present invention and such a resultant cushion is particularly advantageous where humidity resistance and durability are important. Thus the laminated cushions can be tailor-made to meet particular applications by varying the nature of the thin top layer over the thick modified polyurethane foam layer. When the thin top layer is of a natural rubber latex or synthetic rubber latex such as a butadiene styrene copolymer latex foam, the organic solvent of the adhesive layer 4 is preferably a non-aromatic solvent such as methyl ethyl ketone.

It is to be understood that in accordance with the provisions of the patent statutes, the particular form of product shown and described and the particular procedure set forth are presented for purposes of explanation and illustration and that various modifications of said product and procedure can be made without departing from my invention.

Having thus described my invention, what I claim is:

1. A flexible foam cushion comprising (1) a relatively thin upper foam layer of a relatively low density cellular polyurethane elastomer, said elastomer being the reaction product of an organic diisocyanate and an acyclic hydroxyl-terminated polyalkylene ether having a molecular weight of about 1500 to 5000, and (2) a relatively thick foam base layer of a relatively low density cellular polyurethane elastomer, said base layer having a lower deflection per unit of load at high deflection than said upper layer, said last-named elastomer being the reaction product of (a) an organic diisocyanate, (b) an acyclic hydroxyl-terminated polyalkylene ether having a molecular weight of 1500 to 5000 in an equivalent weight ratio of diisocyanate to glycol of about 2:1 to 6:1, (c) an activator mixture comprising water and a reaction catalyst which influences the polyurethane foaming reaction, and (d) about 10 to 25 parts by weight based on 100 parts by weight of the polyalkylene ether plus diisocyanate of elongated wood cellulose particles having a particle size of about 1 to 100 microns.

2. A flexible foam cushion as defined in claim 1 wherein said last-named elastomer is the reaction product of a poly-(ethylene-propylene) ether glycol having a molecular weight in the neighborhood of 2000 and tolylene diisocyanate and contains a tertiary amine reaction catalyst and about 0.1 to 2 percent by weight based on the polyalkylene ether glycol of a silicone oil.

3. A flexible foam cushion comprising (1) a relatively thin upper foam layer of a relatively low density cellular solid polyurethane elastomer substantially free of reinforcing filler, said elastomer being the reaction product of a diisocyanate and a polyalkylene ether glycol having a molecular weight of about 1500 to 5000, and (2) a relatively thick foam base layer of a relatively low density cellular polyurethane elastomer, said base layer having a lower deflection per unit of load at high deflection than said upper layer, said last-named elastomer being the reaction product of a polyalkylene ether glycol having a molecular weight of 1500 to 5000 and a diisocyanate in an equivalent weight ratio of diisocyanate to glycol of about 2:1 to 6:1 with about 10 to 25 parts by weight based on 100 parts by weight of the glycol plus diisocyanate of elongated wood cellulose particles having a particle size of about 35 to 90 microns, said particles having lengths several times their thicknesses.

References Cited in the file of this patent

UNITED STATES PATENTS

| | | |
|---|---|---|
| 1,843,893 | Becher | Feb. 2, 1932 |
| 2,688,070 | Freedlander | Aug. 31, 1954 |
| 2,785,739 | McGregor et al. | Mar. 19, 1957 |
| 2,842,506 | Roussel | July 8, 1958 |
| 2,977,330 | Bower | Mar. 28, 1960 |